United States Patent
Utro et al.

(10) Patent No.: US 12,412,100 B2
(45) Date of Patent: Sep. 9, 2025

(54) CELL STATE TRANSITION FEATURES FROM SINGLE CELL DATA

(71) Applicant: International Business Machines Corporation, Armonk, NY (US)

(72) Inventors: Filippo Utro, Pleasantville, NY (US); Kahn Rhrissorrakrai, Woodside, NY (US); Laxmi Parida, Mohegan Lake, NY (US); Aldo Guzman Saenz, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 17/155,840

(22) Filed: Jan. 22, 2021

(65) Prior Publication Data

US 2022/0237471 A1 Jul. 28, 2022

(51) Int. Cl.
*G06N 3/123* (2023.01)
*G06N 20/00* (2019.01)

(52) U.S. Cl.
CPC ............ *G06N 3/123* (2013.01); *G06N 20/00* (2019.01)

(58) Field of Classification Search
CPC ................................ G06N 3/123; G06N 20/00
See application file for complete search history.

(56) References Cited

U.S. PATENT DOCUMENTS

| | | | | |
|---|---|---|---|---|
| 6,003,029 | A * | 12/1999 | Agrawal | G06F 18/23 |
| 11,615,285 | B2 * | 3/2023 | Reimann | G06N 7/01 |
| | | | | 706/25 |
| 2004/0189665 | A1 * | 9/2004 | Perry | G06T 15/503 |
| | | | | 345/611 |

(Continued)

FOREIGN PATENT DOCUMENTS

WO 2018147608 A2 8/2018

OTHER PUBLICATIONS

Nguyen, Q. H., Lukowski, S. W., Chiu, H. S., Senabouth, A., Bruxner, T. J. C., Christ, A. N., Palpant, N. J., & Powell, J. E. Single-cell RNA-seq of human induced pluripotent stem cells reveals cellular heterogeneity and cell state transitions between subpopulations. Genome Res. Jul. 2018 28:1053-1066 (Year: 2018).*

(Continued)

*Primary Examiner* — Jeremy L Stanley
(74) *Attorney, Agent, or Firm* — SCULLY, SCOTT, MURPHY & PRESSER, P.C.; Kimberly Zillig

(57) ABSTRACT

Methods and systems for training a machine learning model are described. A processor can transform single cell data in a first space into projection data in a second space having a dimensionality lower than or equal to the first space. The processor can produce a cover having a plurality of sets of the projection data. The processor can determine a plurality of transition paths among the plurality of sets. A transition path can represent a transition from one cell state to another cell state. The processor can translate the transition paths from the second dimensional space to the first dimensional space. The processor can extract features from the transition paths in the first dimensional space. The processor can generate training data using the features, and use the training data to train a machine learning model for classifying cell state transitions.

18 Claims, 11 Drawing Sheets

(56) References Cited

U.S. PATENT DOCUMENTS

| | | | |
|---|---|---|---|
| 2010/0002929 A1* | 1/2010 | Sammak | G06T 7/0014 |
| | | | 382/133 |
| 2010/0119141 A1* | 5/2010 | Weinstein | G06F 18/2135 |
| | | | 382/133 |
| 2016/0034561 A1* | 2/2016 | Sexton | G06F 16/9024 |
| | | | 707/737 |
| 2016/0070950 A1* | 3/2016 | Chen | G06V 20/698 |
| | | | 382/133 |
| 2016/0246871 A1* | 8/2016 | Singh | G16B 40/00 |
| 2016/0364522 A1* | 12/2016 | Frey | G16B 40/20 |
| 2017/0159130 A1* | 6/2017 | Mitra | C12Q 1/6886 |
| 2017/0321281 A1* | 11/2017 | Iavarone | C12Q 1/6886 |
| 2018/0137155 A1* | 5/2018 | Majumdar | G06N 10/00 |
| 2019/0120919 A1* | 4/2019 | Saggar | A61B 5/165 |
| 2020/0020419 A1* | 1/2020 | Kahvejian | G16B 40/30 |
| 2020/0090782 A1* | 3/2020 | Thomson | G16B 50/00 |
| 2020/0109455 A1* | 4/2020 | Rabadan | G16B 20/20 |
| 2020/0251182 A1* | 8/2020 | Platt | G16B 30/10 |
| 2020/0320709 A1* | 10/2020 | Geipel | G06F 18/214 |
| 2020/0370112 A1* | 11/2020 | Newman | G16B 20/00 |
| 2020/0377844 A1* | 12/2020 | Paul | C12N 5/0018 |
| 2021/0057042 A1* | 2/2021 | Beaubier | G16B 5/20 |
| 2021/0081825 A1* | 3/2021 | Nakamura | G06N 5/04 |
| 2021/0102194 A1* | 4/2021 | Steemers | C12N 15/1065 |
| 2021/0158901 A1* | 5/2021 | Khetan | G06N 3/126 |
| 2021/0166785 A1* | 6/2021 | Yip | G06T 11/206 |
| 2021/0224986 A1* | 7/2021 | Chen | A61B 8/4427 |
| 2021/0256394 A1* | 8/2021 | Tymoshenko | G06N 3/123 |
| 2021/0327540 A1* | 10/2021 | Schobel | G16H 50/20 |
| 2021/0398676 A1* | 12/2021 | Evans | G06N 3/08 |
| 2022/0101147 A1* | 3/2022 | Konno | G16B 45/00 |
| 2022/0170097 A1* | 6/2022 | Boroughs | C12Q 1/6881 |
| 2022/0238227 A1* | 7/2022 | Hirata | G16H 50/30 |
| 2022/0340976 A1* | 10/2022 | Aguirre | G06N 3/08 |
| 2022/0403335 A1* | 12/2022 | Wolf | G16B 15/30 |
| 2023/0052677 A1* | 2/2023 | Eser | G16B 15/30 |
| 2023/0121965 A1* | 4/2023 | Kitano | G06N 7/01 |
| | | | 706/25 |
| 2023/0235400 A1* | 7/2023 | Mootha | G16B 20/20 |
| | | | 435/6.11 |
| 2023/0251245 A1* | 8/2023 | Rhodes | G16B 20/20 |
| | | | 435/6.11 |
| 2023/0268024 A1* | 8/2023 | Riesenfeld | G16B 25/10 |
| | | | 702/19 |
| 2023/0306761 A1* | 9/2023 | Sirbulescu | G06T 7/0012 |
| 2023/0307086 A1* | 9/2023 | Huang | G16C 20/30 |
| 2023/0317204 A1* | 10/2023 | Cheng | G16B 40/20 |
| | | | 702/19 |

OTHER PUBLICATIONS

Roman, T., Nayyeri, A., Fasy, B.T. et al. A simplicial complex-based approach to unmixing tumor progression data. BMC Bioinformatics 16, 254 (Year: 2015).*

Tran TN, Bader GD. Tempora: Cell trajectory inference using time-series single-cell RNA sequencing data. PLoS Comput Biol. Sep. 9, 2020;16(9):e1008205. doi: 10.1371/journal.pcbi.1008205. PMID: 32903255; PMCID: PMC7505465. (Year: 2020).*

Mandal et al. "A Topological Data Analysis Approach on Predicting Phenotypes from Gene Expression Data." Algorithms for Computational Biology, ALCoB 2020. Part of the Lecture Notes in Computer Science book series, https://doi.org/10.1007/978-3-030-42266-0_14. Online Apr. 3, 2020. pp. 178-187. (LNCS, vol. 12099).

Guzmán-Sáenz et al. "Signal enrichment with strain-level resolution in metagenomes using topological data analysis." BMC Genomics: https://doi.org/10.1186/s12864-019-5490-y. Published Apr. 4, 2019. pp. 25-34. vol. 20, 194.

Koyama et al. "Topological data analysis revealed complexity behind ER positive breast cancer subtypes in TCGA transcriptome data." Cancer Research, Abstract 2497. DOI: 10.1158/1538-7445. AM2020-2497. Published Aug. 2020. 2 pages. vol. 80, Issue 16 Supplement.

Rizvi et al., "Single-cell topological RNA-seq analysis reveals insights into cellular differentiation and development." Nature Biotechnology; doi:10.1038/nbt.3854. Accepted Mar. 20, 2017 and published online May 1, 2017. 14 pages.

Wang et al. "Topological Methods for Visualization and Analysis of High Dimensional Single-Cell RNA Sequencing Data." Biocomputing. 2019, pp. 350-361.

Rabadán et al. "Identification of relevant genetic alterations in cancer using topological data analysis." Nature Communications 11; https://doi.org/10.1038/s41467-020-17659-7. Accepted Jul. 9, 2020 and published Jul. 30, 2020. 10 pages. Article # 3808.

Cacchiarelli et al. "Aligning Single-Cell Developmental and Reprogramming Trajectories Identifies Molecular Determinants of Myogenic Reprogramming Outcome." Cell Systems; DOI: 10.1016/j.cels.2018. 07.006. Sep. 26, 2018. 15 pages. vol. 7 Issue 3.

Trapnell et al. "The dynamics and regulators of cell fate decisions are revealed by pseudotemporal ordering of single cells." Nature Biotechnology; doi: 10.1038/nbt.2859. Apr. 2014. pp. 381-386. 32(4).

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

CELL STATE TRANSITION FEATURES FROM SINGLE CELL DATA

BACKGROUND

The present disclosure relates in general to computing systems and methods, and more specifically, to cognitive computing systems and methods configured to identify cell state transitions using machine learning techniques on single cell data.

Medicine resistance can be a limiting factor in curing various diseases, such as cancer. In some examples, medicine development applications for developing medicines can use bulk sequencing data (e.g., data representing bulk of cells) analysis to develop medicines and treatments for diseases. However, bulk sequencing analysis may not characterize individual cell states, leading to failures in determining when and how cells change state. Cell state transition can allow characterization of cell state populations, including outlier states that may represent phenotypes such as medicine resistance or signs of relapse, for residual disease monitoring, new medicine screens, or patient-personalized treatments.

SUMMARY

In some examples, a method for training a machine learning model is generally described. The method can include transforming, by a processor, a set of single cell data in a first dimensional space into a set of projection data in a second dimensional space having a dimensionality lower than or equal to a dimensionality of the first dimensional space. The method can further include producing, by the processor, a cover of the set of projection data. The cover can include a plurality of sets, and a union of the sets can include the entirety of the set of projection data. The method can further include determining, by the processor, a plurality of transition paths among the plurality of sets. A transition path can represent a transition from one cell state to another cell state. The method can further include translating, by the processor, the plurality of transition paths from the second dimensional space onto the set of single cell data in the first dimensional space. The method can further include extracting, by the processor, a plurality of features from the transition paths translated onto the first dimensional space. The method can further include generating, by the processor, a set of training data using the extracted features. The method can further include training, by the processor, a machine learning model using the set of training data. The machine learning model can be trained for classifying transitions between different cell states.

In some examples, a system for training a machine learning model is generally described. The system can include a memory configured to store a set of instructions. The system can further include a processor configured to be in communication with the memory. The processor can be configured to execute the set of instructions to transform a set of single cell data in a first dimensional space data into a set of projection data in a second dimensional space having a dimensionality lower than or equal to a dimensionality of the first dimensional space. The processor can be further configured to execute the set of instructions to produce a cover of the set of projection data. The cover can include a plurality of sets, and a union of the sets include the entirety of the set of projection data. The processor can be further configured to execute the set of instructions to determine a plurality of transition paths among the plurality of sets. A transition path can represent a transition from one cell state to another cell state. The processor can be further configured to execute the set of instructions to translate the plurality of transition paths from the second dimensional space onto the set of single cell data in the first dimensional space. The processor can be further configured to execute the set of instructions to extract a plurality of features from the transition paths translated onto the first dimensional space. The processor can be further configured to execute the set of instructions to generate a set of training data using the extracted features. The processor can be further configured to execute the set of instructions to train a machine learning model using the set of training data, wherein the machine learning model is being trained for classifying transitions between different cell states.

In some examples, a computer program product for training a machine learning model is generally described. The computer program product may include a computer readable storage medium having program instructions embodied therewith. The program instructions may be executable by a processor to cause the processor to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

In an example, single cell sequencing data can provide resolution of the cellular state of a biological sample. Single cell sequencing data analysis can involve data in relatively high dimensionality space, and can typically involve relatively large amounts of individual gene information, causing difficulty in identifying potentially small fraction of cells whose state may be in transition from one cell state to another cell state.

Figure 1:
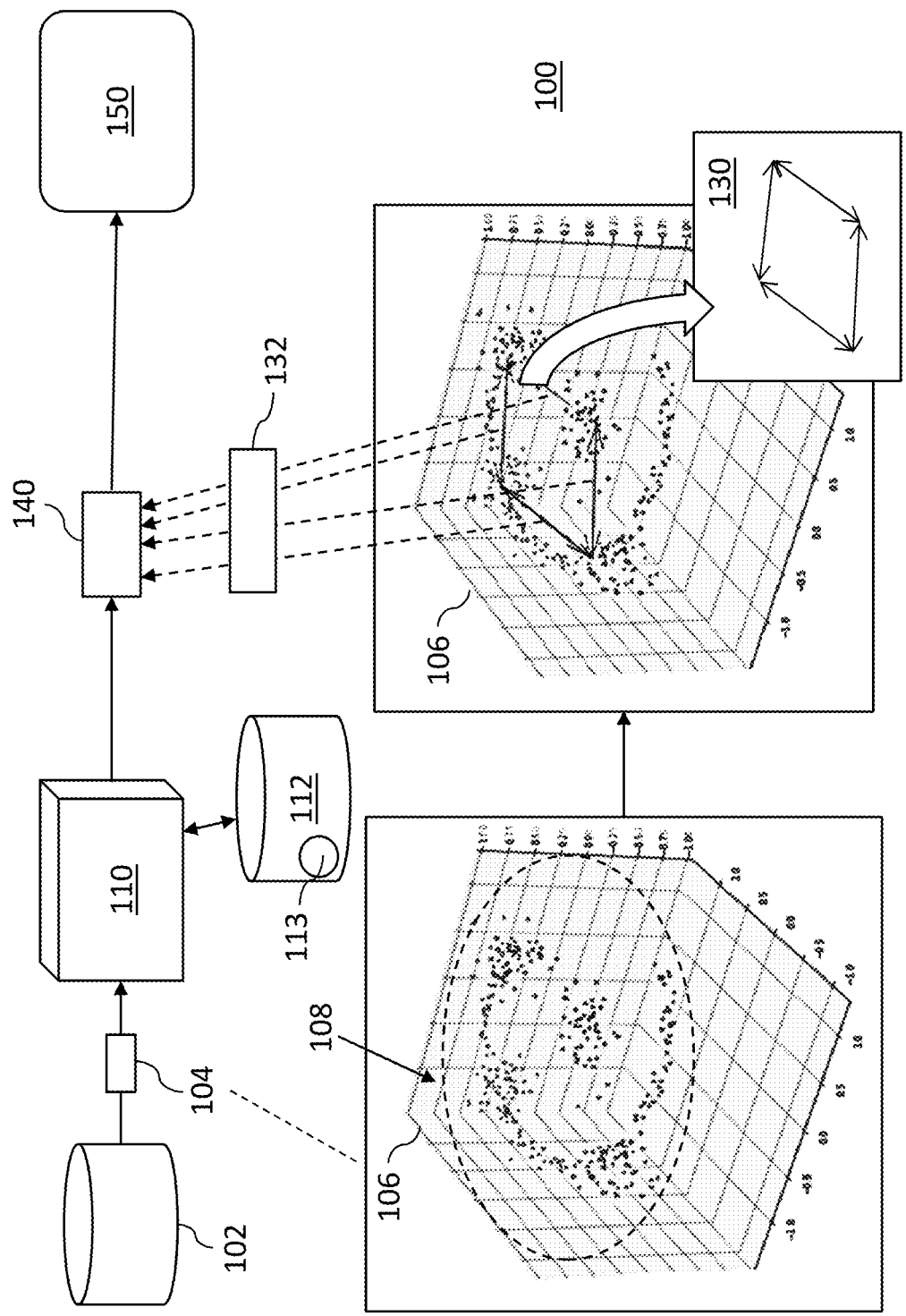
FIG. 1 is a diagram showing an example system that can implement cell state transition features from single cell data in one embodiment.

The methods and systems described herein can use single cell data to identify all cell state populations among the single cell data, and the underlying features that support transitions from one cell state to another cell state. The methods and systems described herein can transform the single cell data to a lower dimensional space (or another space of equal dimensionality) that preserves the feature space (e.g., the original dimensional space of the single cell data). In the lower dimensional space, transition paths between cell states can be identified by constructing trajectory using topological data analysis (TDA) techniques to establish relationships between cell states, in particular at the edges between nodes as well as within heterogeneous nodes. The identified transition paths can be mapped back to the original dimensional space, and features can be extracted from the transition paths mapped to the original dimensional space. These extracted features can be used to derive new medicine resistant cell line lines for medicine screens through knockout or knockup assays. For example, the extracted features can be used as training data to train machine learning models (e.g., classification models, neural network, deep learning models, etc.) that can classify single cell data into cell state transitions, where these cell state transitions can indicate changes in cellular phenotypes. The cell state transitions outputted by these machine learning models can be used to derive hyper-personalized patient therapies through development of targeted treatments, such as clustered regularly interspaced short palindromic repeats (CRISPR) and antibody vectors. For example, Characterize extracted features for implicated biological pathways FIG. 1 is a diagram showing an example system that can implement cell state transition features from single cell data in one embodiment. The system 100 can include a data source 102, a processor 110, and a memory 112. The processor 110 can be, for example, a processing unit (e.g., a central processing unit or microprocessor, a processor core, and/or other types of processing unit) of a computer device (e.g., desktop computer, server-class computer, laptop computer, and/or other types of computing devices). The processor 110 can be configured to be in communication with the data source 102 and the memory 112. In some examples, the data source 102, the processor 110, and the memory 112 can be part of the same computer device. In some examples, the data source 102, the processor 110, and the memory 112 can be located in different or separate devices and configured to be in communication through a network (e.g., the Internet, a cellular network, and/or other types of wired or wireless network). For example, the data source 102 can be located in a first geographical location, and the processor 110 and memory 112 can be located a different geographical location, where the data source 102, the processor 110, and the memory 112 can be part of a cloud computing network.

The memory 112 can be, for example, a memory device including volatile and/or non-volatile memory elements. The memory 112 can be configured to store a set of instructions 113. The set of instructions 113 can include, for example, source code and/or executable code. The set of instructions 113 can be executable by the processor 110 to perform one or more task to implement the system 100. In some examples, the set of instructions 113 can be program modules including, but not limited to, routines, programs, objects, components, logic, data structures, and other types of program modules.

The data source 102 can store a set of single cell data (or dataset) of a plurality of subjects. The single cell data stored in the data source can be categorized into different cell states, such as different stages of diseases including, but not limited to, various types of cancer and/or other types of diseases. The processor 110 can be configured to receive or obtain one or more subsets of the set of single cell data stored in the data source 102. For example, in the example shown in FIG. 1, the processor 110 can obtain single cell data 104 from the data source 102. The single cell data 104 can be, for example, single cell deoxyribonucleic acid (DNA) sequencing data, single cell ribonucleic acid (RNA) sequencing data, and/or other types of single cell data of an individual subject.

In an example embodiment, the single cell data 104 can be a matrix, such as a gene expression matrix. For example, the single cell data 104 can be a matrix, where the matrix's elements can be count values, where rows of the matrix can be associated with a plurality of gene identifiers (ID), and columns of the matrix can be associated with a plurality of cell identifiers (e.g., cellular barcodes). In some examples, the single cell data 104 can be a transpose of the matrix such that the rows can be associated with the cell identifiers and the columns can be associated with the gene identifiers. The elements of the matrix can be represented as a plurality of data points 108 in a first dimensional space 106. The processor 110 can be configured to transform the single cell data 104 from the first dimensional space 106 into a set of projection data in a second dimensional space that has a lower dimensionality, or an equivalent dimensionality, when compared to the dimensionality of the first image dimensional space 106.

The processor 110 can be configured to determine a plurality of transition paths using the projection data in the second dimensional space, and translate the determined transition paths back to the first dimensional space 106. The processor 110 can be configured to identify a set of data points 132 from the translated transition paths 130 in the first dimensional space 106. The identified set of data points 132 can be, for example, data points that are positioned on the translated transition paths 130 in the first dimensional space 106. The processor 110 can be configured to generate the set of training data 140 using the extracted set of data points 132. The processor 110 can be configured to train a machine learning model 150 using the training data 140. The machine learning model 150 can be, for example, a classification model, a neural network, a deep learning model, and/or other types of machine learning models. By using data points positioned along a plurality of transition paths in the original dimensional space (e.g., first dimensional space 106) of the single cell data 104, the machine learning model 150 can be trained to learn how individual cells transition from one cell state to another cell state in the original dimensional space.

Figure 2A:
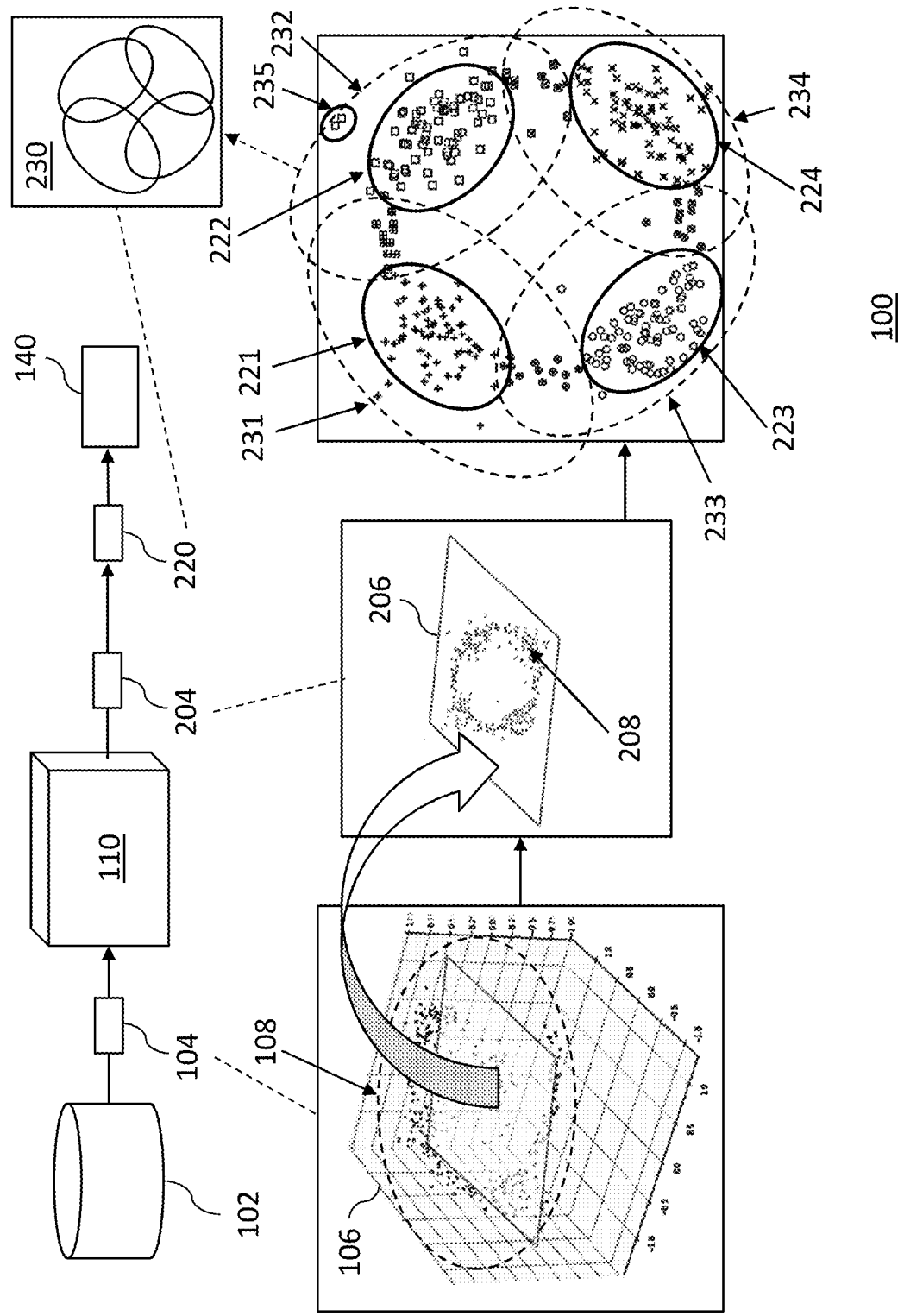
FIG. 2A is a diagram showing an example implementation of the example system of FIG. 1 to generate a cover for a set of projection data in one embodiment.

FIG. 2A is a diagram showing an example implementation of the example system of FIG. 1 to generate a cover for a set of projection data in one embodiment. In the example shown in FIG. 2A, the processor 110 can be configured to execute dimensionality reduction techniques on the single cell data 104 to transform the single cell data 104 into a set of projection data 204. The projection data 204 can be represented as a set of projection points 208 in the second in a second dimensional space 206. The second dimensional space 206 can have a lower dimensionality, or an equivalent dimensionality, when compared to the first image dimensional space 106. The transformation of the single cell data 104 in the first dimensional space 106 into the projection data 204 in the second dimensional space can preserve a feature space (e.g., first image dimensional space 106) of the original input data (e.g., single cell data 104). Further, as a result of the transformation, every projection point among the set of projection points 208 can be transformed from exactly one data point among the set of data point 108.

By way of example, the set of instructions 113 stored in the memory 112 can be implemented by the processor 110 to implement various machine learning algorithms and techniques that can perform the transformation from the single cell data 104 in the first dimensional space 106 into the projection data 204 in the second dimensional space 206. For example, the set of instructions 113 can include executable code that can be implemented by the processor 110 to transform the single cell data 104 into the projection data 204 using random forest, principal component analysis (PCA), multidimensional scaling (MDS), linear discriminant analysis (LDA), and/or other types of supervised or unsupervised machine learning algorithms or techniques that can be used for dimensionality reduction. A choice of the machine learning algorithm being used for the transformation can depend on the dimensionality of the first dimensional space 106 and the second dimensional space 206.

In response to transforming the single cell data 104 into the projection data 204, the processor 110 can identify all distinct cell state populations among the projection data 204. In an example, to identify all distinct cell state populations, the processor 110 can perform set covering on the projection data 204 to produce a set of subsets that can have non-trivial intersections between its elements. In some examples, the set covering can be achieved by first performing a clustering technique (e.g., partitioning the set of projection data 204 to obtain a set of subsets that are disjoint), and then expand the clusters to cause some of the clusters to overlap, resulting in a cover of the set of projection data 204. In the example shown in FIG. 2A, the processor 110 can apply a clustering technique to cluster the set of projection data 204 into a plurality of clusters 221, 222, 223, 224. Note that the clusters 221, 222, 223, 224 shown in FIG. 2A may not overlap with one another.

By way of example, the set of instructions 113 stored in the memory 112 can be implemented by the processor 110 to implement various supervised or unsupervised cluster models (or clustering algorithms or techniques) to cluster the projection points 208. Such cluster models can include, but not limited to, centroid models (e.g., k-means clustering), density models (e.g., density-based spatial clustering of applications with noise (DBSCAN)), group models, and/or other types of cluster models that can be used to cluster the projection points 208. A choice of the clustering algorithm or cluster model being used by the processor 110 can depend on various properties of the projection data 204 and the second dimensional space 206.

The processor 110 can expand the coverage areas of the clusters 221, 222, 223, 224 in the second dimensional space 206 to produce a cover 230 for the set of projection points 208 among the projection data 204. For example, the clusters 221, 222, 223, 224 can be expanded to sets 231, 232, 233, 234, respectively. The cover 230 of the set of projection points 208 can be a collection of sets whose union includes the set of projection points 208 as a subset. In the example shown in FIG. 2A, the cover 230 can include a plurality of sets 231, 232, 233, 234, where a set of a cover can be a set of elements or a partition including elements of the cover. A union of the sets 231, 232, 233, 234 can include an entire set of projection points 208. Further, some of the sets among the sets 231, 232, 233, 234 can overlap one another. For example, the set 231 can overlap with the sets 232, 233, the set 232 can overlap with the sets 231, 234, the set 233 can overlap with the sets 231, 234, and the set 234 can overlap with the sets 232, 233.

In an example, outlier points, such as a set of outlier points 235 may not be within any cluster, but the expansion of the cluster 222 to the set 232 allow the outlier points 235 to be included in the set 232. In some examples, the processor 110 can expand the clusters until all outlier points (e.g., points that do not belong to any cluster) are within a set, such that the cover can include all projection points 208. The expansion of the clusters 221, 222, 223, 224 to produce the cover 230 can allow outlier points to be categorized into cell populations as well.

Figure 2B:
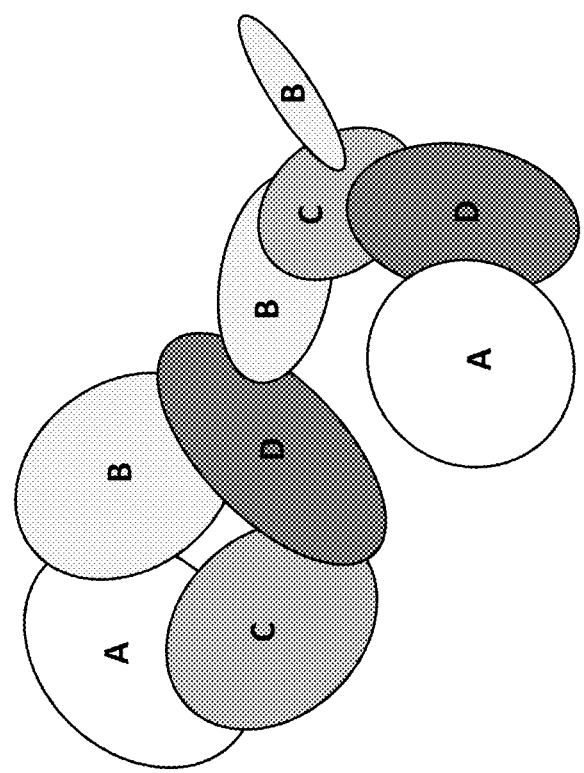
FIG. 2B is a diagram showing an example cover that can be generated by an implementation of the example system of FIG. 1 in one embodiment.

Each set among the plurality of sets 231, 232, 233, 234, can represent a cell state. In the example shown in FIG. 2A, as a result of generating the cover 230 having the sets 231, 232, 233, 234, four distinct cell state populations represented by sets 231, 232, 233, 234 are identified. Although the cover 230 shown in FIG. 2A has four sets, it will be apparent to a person of ordinary skill in the art that the processor 110 can generate a cover having an arbitrary number of sets. For example, if the single cell data 104 includes four types of data points (e.g., data points 108) corresponding to four cell states, then there can be at least four cell state populations among the projection data 204 resulting in at least four sets. Further, each cell state population among the projection points 208 can be scattered across the second dimensional space 206 such that more than one non-overlapping sets can be formed for each cell state population. For example, another cover 240 is shown in FIG. 2B, where four distinct cell states or cell state population, labeled as A, B, C, D, are identified by constructing the cover 240. Using cell state A as an example, the cell state A has two sets of distinct population and thus, there can be two non-overlapping sets for the cell state A in the cover 240.

The processor 110 can be further configured to generate data relating to the cover 230 and the sets that formed the cover 230, and store the generated data in the memory 112. These data can include, for example, the number of projection points in each set, the sizes of the sets, the location of the sets in the second dimensional space 206, the locations of each projection point in each set, various properties of the sets such as locations of centroids of the sets, and/or other information of the sets of the cover 230.

Figure 3A:
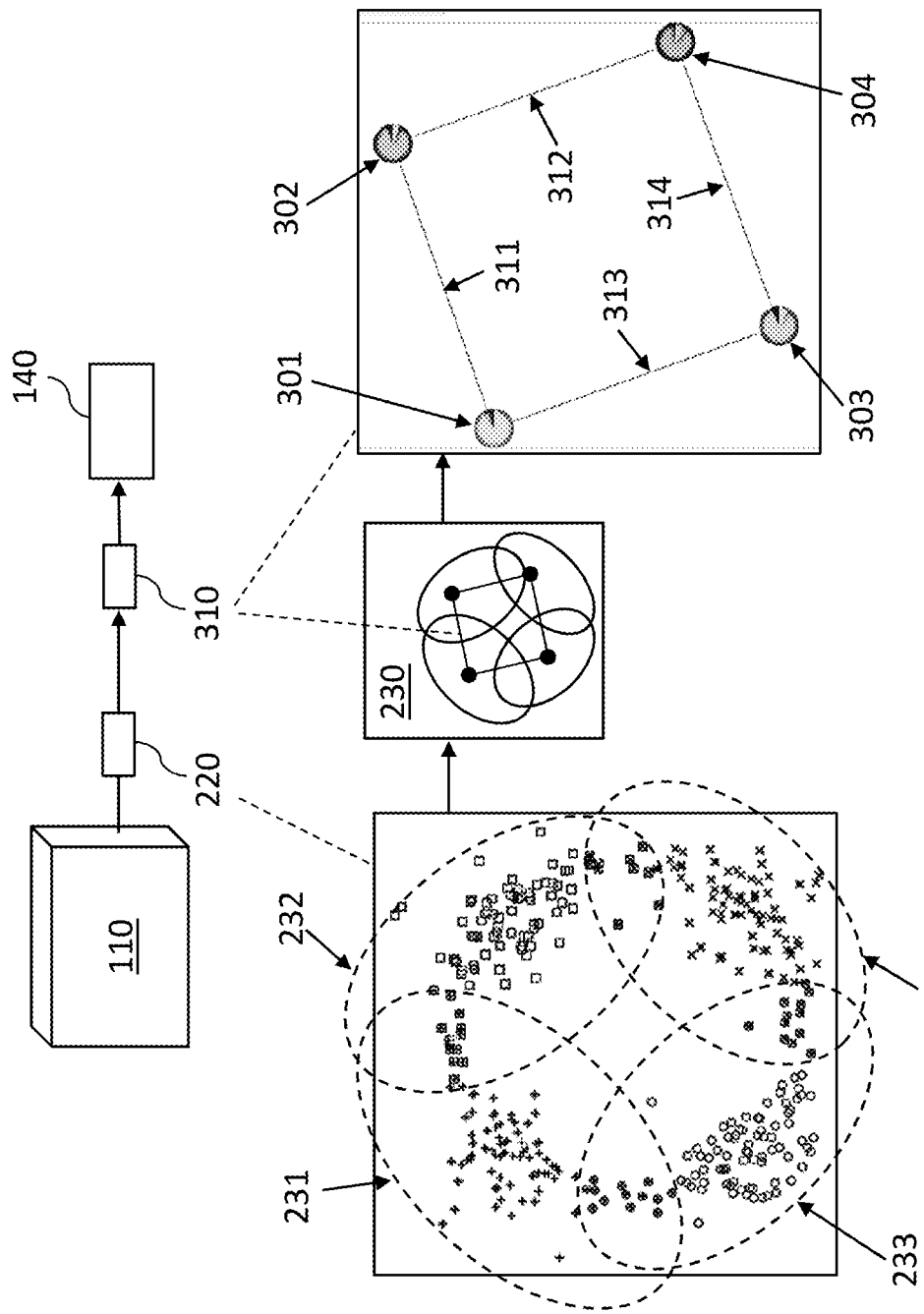
FIG. 3A is a diagram showing an example implementation of the example system of FIG. 1 to identify transition paths in one embodiment.

FIG. 3A is a diagram showing additional details of the example system of FIG. 1 in one embodiment. In response to identifying the distinct cell state populations in the projection data 204, the processor 110 can identify all transition paths between the distinct cell state populations. To identify the transition paths, the processor 110 can perform trajectory analysis using techniques such as topological data analysis (TDA). To identify the transition paths among the distinct cell populations, the processor 110 can construct a simplicial complex 310 from the cover 230. The simplicial complex 310 can be a standard simplicial complex or a weighted simplicial complex of the cover 230. In an example, a weighted simplicial complex can be chosen over a non-weighted simplicial complex in response to an amount of overlap between cover sets satisfying specific criteria (e.g., satisfying an optimization of a particular model). The amount of overlap can be used to determine the weights for their respective edges. For example, larger overlaps in a given dataset can indicate more gradual transitions across cell types, whereas smaller overlaps can indicate sharper transitions. The amount of overlap can be modulated with features recovered from transition vectors or paths. The simplicial complex 310 can be constructed using an 1-skeleton of a nerve of the cover 230 (e.g., vertices corresponding to sets in the cover, and edges corresponding to intersections of two sets in the cover). For example, an edge can connect the centroids of the sets 231, 232, and another edge can connect the centroids of the sets 231 and 233. Note that no edge is connecting the sets 231 and 234 because the sets 231 and 234 do not overlap one another.

Figure 3B:
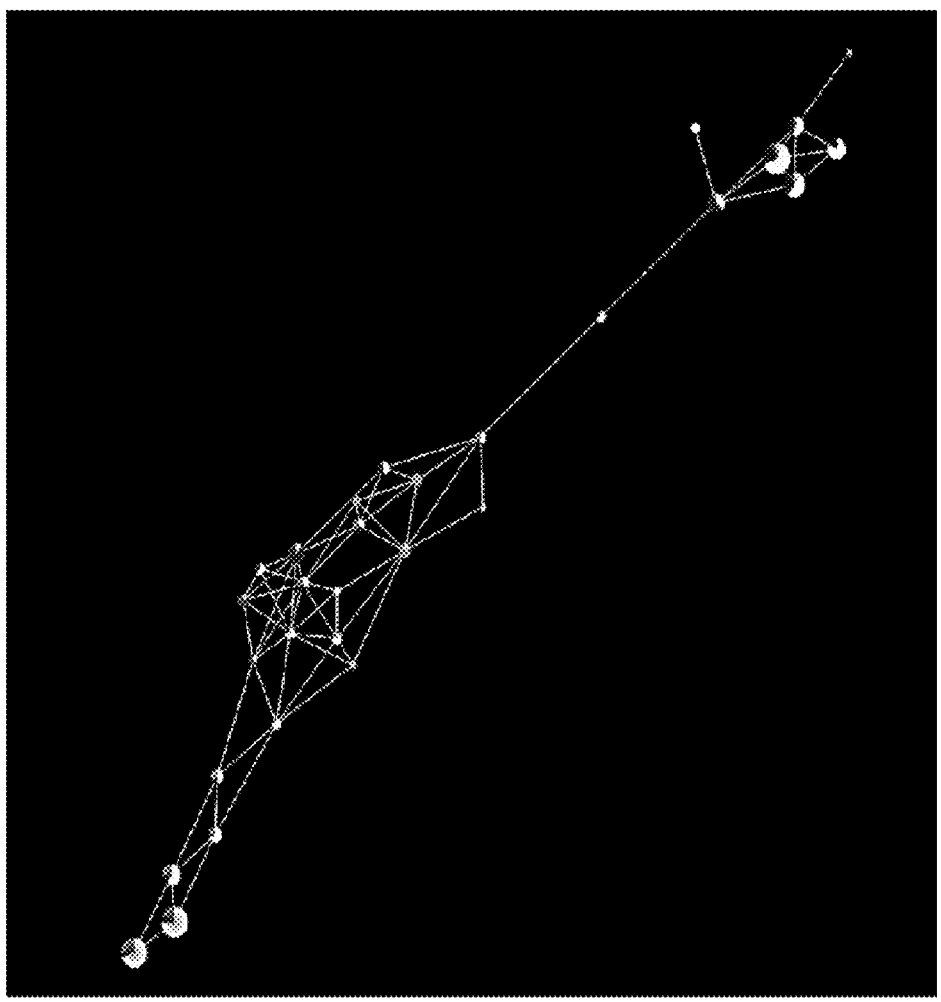
FIG. 3B is a diagram showing an example set of transition paths that can be identified by an implementation of the example system of FIG. 1 in one embodiment.

In the example shown in FIG. 3A, the simplicial complex 310 can include vertices or nodes 301, 302, 303, 304 representing the sets 231, 232, 233, 234, respectively; and can include edges 311, 312, 313, 314 representing the 1-skeleton of the nerve of the cover 230. In some examples, the nodes 301, 302, 303, 304 can represent the centroids of the sets 231, 232, 233, 234, respectively. In some examples, the centroids of clusters represented by the nodes 301, 302, 303, 304 can be projection points among the projection points 208 (see FIG. 2A) in the second dimensional space 206. The edges 311, 312, 313, 314 can be identified by the processor 110 as a plurality of transition paths between different cell states (e.g., between different clusters representing different cell states). Another example simplicial complex 320 having additional nodes representing additional clusters is shown in FIG. 3B. In the example shown in FIG. 3B, the simplicial complex 320 can include more than four nodes, and the nodes among the simplicial complex 320 can represent an arbitrary number of cell states, such as a number of cell states represented by the original input single cell data 104.

Figure 4:
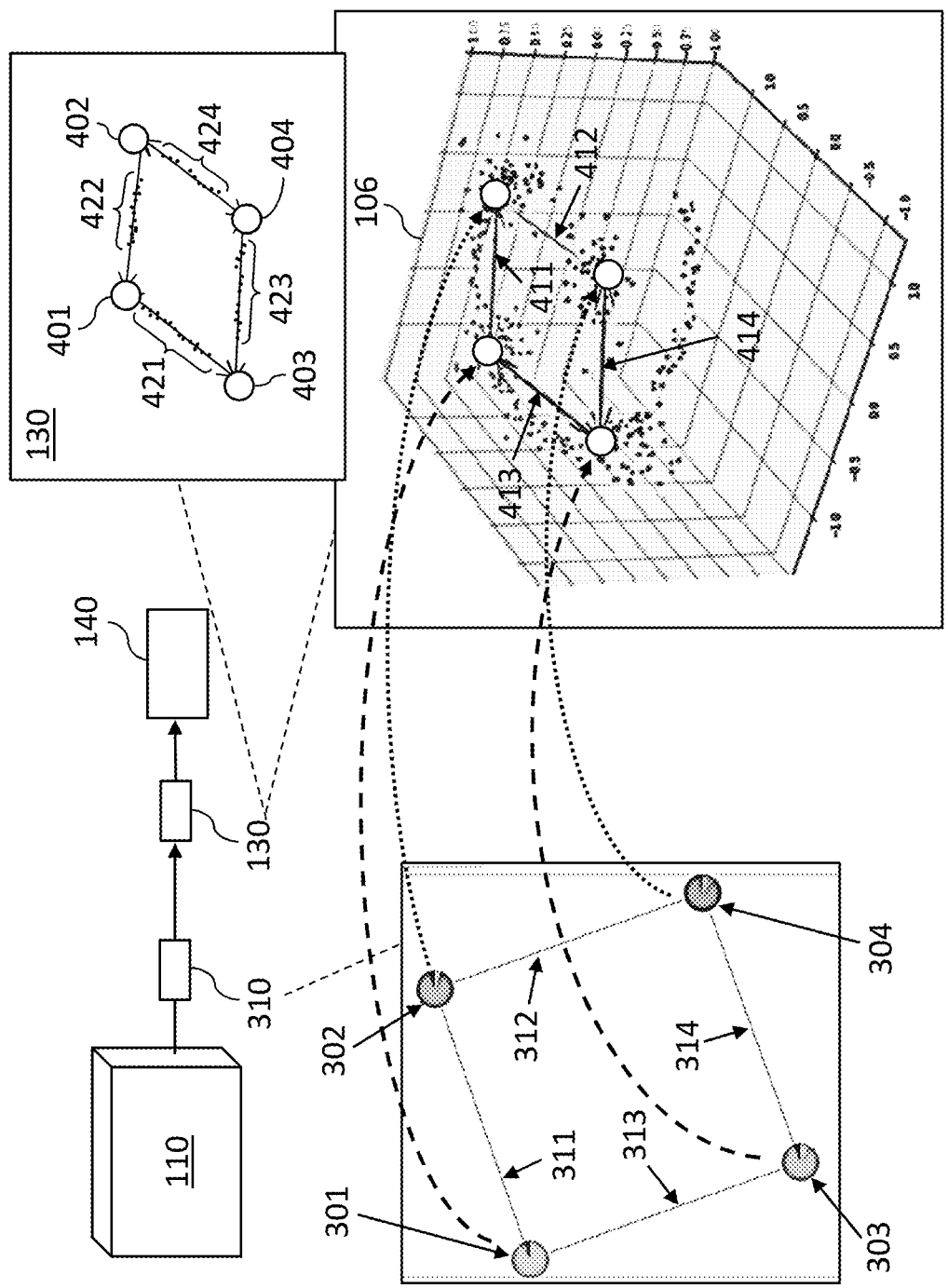
FIG. 4 is a diagram showing an example implementation of the example system of FIG. 1 to translate a plurality of transition paths to an original dimensional space in one embodiment.

FIG. 4 is a diagram showing an example implementation of the example system of FIG. 1 to translate a plurality transition paths to an original dimensional space in one embodiment. The processor 110 can be configured to translate the edges, or the plurality of transition paths, 311, 312, 313, 314 from the second dimensional space 206 onto the set of single cell data 104 in the first dimensional space 106. In an example, the processor 110 can map the nodes 301, 302, 303, 304 (or centroids of the sets 231, 232, 233, 234 in FIG. 2A) to their corresponding data point in the first dimensional space 106. In the example shown in FIG. 4, the nodes 301, 302, 303, 304 are mapped to data points 401, 402, 403, 404, respectively, where the data points 401, 402, 403, 404 can be among the data points 108 (see FIG. 1) in the first dimensional space 106. The data points 401, 402, 403, 404 in the first dimensional space 106 can represent the same cell state as their corresponding nodes in the second dimensional space 206. For example, the data point 401 in the first dimensional space 106 and the node 301 in the second dimensional space 206 can represent the same cell state.

In the example shown in FIG. 4, the transition paths 311, 312, 313, 314 can be translated into a plurality of translated transition paths 411, 412, 413, 414, respectively. In an example, the translated transition paths 411, 412, 413, 414 can be generated by the processor 110 by connecting the data points 401, 402, 403, 404 in the first dimensional space 106. In an example, the processor 110 can determine whether to connect two data points in the first dimensional space based on a presence or absence of transition paths in the second dimensional space. For example, the processor 110 can connect the data points 401 and 402 to generate the translated transition path 411 in the first dimensional path 106 based on a presence of the transition path 311 connecting the nodes 301 and 302 in the second dimensional space 206. In another example, the processor 110 can determine an absence of a transition path between the nodes 301 and 304 in the second dimensional space and, in response, determine that the data points 401 and 404 shall not be connected in the first dimensional space 106.

The translated transition paths, and the data points lying on these translated transition paths, in the first dimensional space 106 can represent a trajectory or path indicating how cells transition from one cell state to another cell state. For example, if the data point 401 represents a cell state A, and the data point 402 represents a cell state B, then data points along the translated transition path 411 can represent a trajectory or path indicating how a cell can transition from the cell state A to the cell state B. In response to generating the translated transition paths in the first dimensional space 106, the processor 110 can extract a set of data points (e.g., set of data points 132 in FIG. 1), from the data points 108, that lies along the generated translated transition paths in the first dimensional space 106. In some examples, the processor 110 can extract a set of data points (e.g., set of data points 132 in FIG. 1), from the data points 108, that lies within a distance from the translated transition paths in the first dimensional space 106. In the example shown in FIG. 4, the processor 110 can extract different sets of data points 421, 422, 423, 424 that lies on the translated transition paths 413, 411, 412, 414, respectively. The processor 110 can generate the set of training data 140 using the extracted features or data points 421, 422, 423, 424. The processor 110 can train a machine learning model 150 (see FIG. 1) using the set of training data 140, where the trained machine learning model 150 can be run by the processor 110 for classifying transitions between different cell states. In some examples, the processor 110 can extract a set of data points, from the data points 108, that has particular characteristics. For example, the processor 110 can extract data points belonging to one or more particular cell states (e.g., particular stages of a disease) that lie along the translated transition paths in the first dimensional space 106.

In an example embodiment, the processor 110 can train the machine learning model 150 using a supervised learning approach, by generating the training data 140 to include a plurality of input-output pair data. In an example, such input-output pair data can use the single cell data in the data source 102 as the input, and characteristics such as cell transitions and disease stages of the single cell data as the output. In another example embodiment, the processor 110 can train the machine learning model 150 using an unsupervised learning approach, by generating the training data 140 to include input data but no output data. In an example, the unsupervised training data can include the single cell data in the data source 102, but exclude characteristics such as cell transitions and disease stages corresponding to the single cell data.

Figure 5:
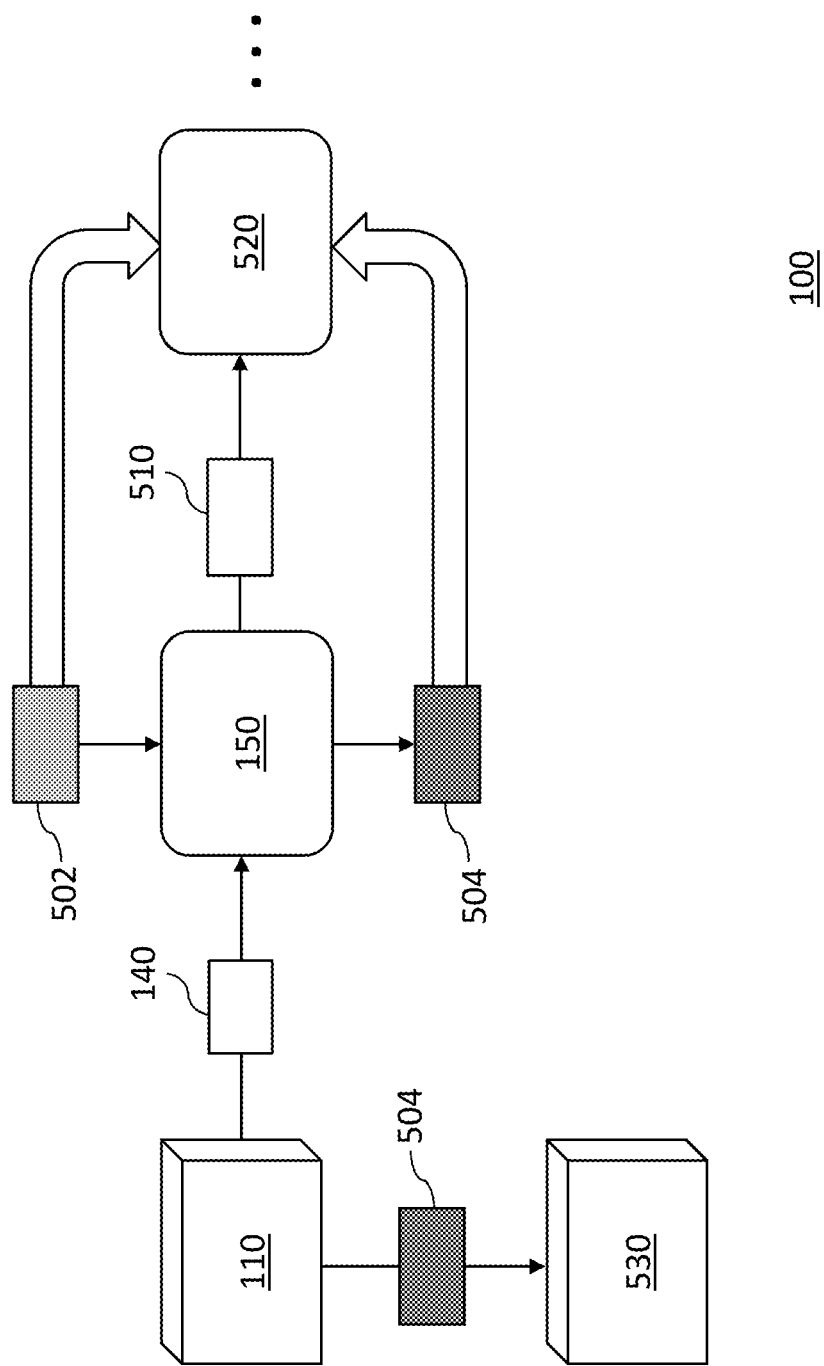
FIG. 5 is a diagram showing another example implementation of the example system of FIG. 1 in one embodiment.

FIG. 5 is a diagram showing another example implementation of the example system of FIG. 1 in one embodiment. In an example, the processor 110 can run the trained machine learning model 150 to classify a set of test data 502. The machine learning model 150 can output a result 504 indicating a classification result of the test data 502. In an example, the test data 502 can be a set of single cell data of an individual subject, and the machine learning model 150 can be a classification model that can classify the test data 502 into a cell state transition. For example, the result 504 can indicate that the individual subject having the single cell data represented by the test data 502 has an X likelihood of being in a transition from a disease stage B to stage C. In another example, the result 504 can indicate that the individual subject having the single cell data represented by the test data 502 has a Y likelihood of being in a transition from current cell state to medicine resistance state. In some examples, the system 100 can further include a screen or a display that can output a user interface, where the user interface can show a visual output indicating the result 504.

Further, the processor 110 can retrain the machine learning model 150 using the test data 502 and the result 504. For example, the processor 110 can update the training data 140 by adding the test data 502 and the result 504 to the training data 140 to generate an updated set of training data 510. The processor 110 can perform retrain the machine learning model 150 by training another machine learning model 520 using the updated training data 510, where the machine learning model 520 can be a updated or refined version of the machine learning model 150. In some examples, the processor 110 can send the result 504 (or results from the updated machine learning model 520, and subsequent retrained models) to another device 530. The device 530 can be a device running another application that can use the result 504. For example, the device 530 can be running an application relating to development of medicines, such as new resistance cell lines for medicine screens, development of agents targeting transition genes and pathways indicated by the result 504, antibody development, CRISPR gene editing, medicine repurposing, and/or other types of medicine development applications. In some examples, the device 530 can develop new medicine resistant cell lines by knocking out or up features (e.g., extracted data points 132) and pathways (e.g., translated transition paths 413, 411, 412, 414) among the result 504. For example, genes can be knocked out or up (e.g., making the gene inoperative) using techniques such as CRISPR, similarly pathways can be knocked out or up with the same approach on key regulators of the pathway. The classification results from the machine learning model 150 can indicate which genes and/or pathways may be contributing to particular cell state changes. Thus, the genes and pathways indicated by the classification result can be knocked out or up from the original dataset (e.g., single cell data 104). The resulting data set can be used to train new machine learning models that can indicate and confirm effects of the knocked out or knocked up genes and pathways on cell state changes among the original dataset. Other types of assay of cell or model viability used in medicine development can also be performed using the remaining dataset after knocking out or up genes and pathways.

In an example, the system 100 can be implemented provide analytical results for medicine development application and systems. For example, an application for medicine resistance in melanoma can utilize the classification results from the machine learning model 150 to determine whether a subject is experiencing relapse after successful treatment in the primary disease. Single cell RNA data of a plurality of cells having, for example, four distinct transcriptional states according to MITF activity (e.g., MITF being a positive biomarker for medicine resistance) can be used to train the machine learning model 150 to identify BRAF mutant melanoma cancer cells. This trained machine learning model 150 can identify the features that are associated with cell state change, such as cells moving from zero MITF activity to higher order of activity (e.g., phase 3). Further, the training of the machine learning model 150 can provide additional topological data, such as the simplicial complex shown in FIG. 3B, that can be used for identifying distinct clusters of cells that can be reflective of not only MITF activity but also potentially new cell classes through learning of new cell labels. Furthermore, the machine learning model 150 can classify how cells can be moving from one cell state to another cell state, and capture cells that are potentially in transition to a higher medicine resistance state. By returning to the original feature space (e.g., first dimensional space 106), the system can identify genes and pathways that may be associated with these potential transitions. Thus, appropriate medicine targeting of these genes and pathways using new targeted agents, such as CRISPR or antibodies, can be therapeutic options to prevent relapse.

Figure 6:
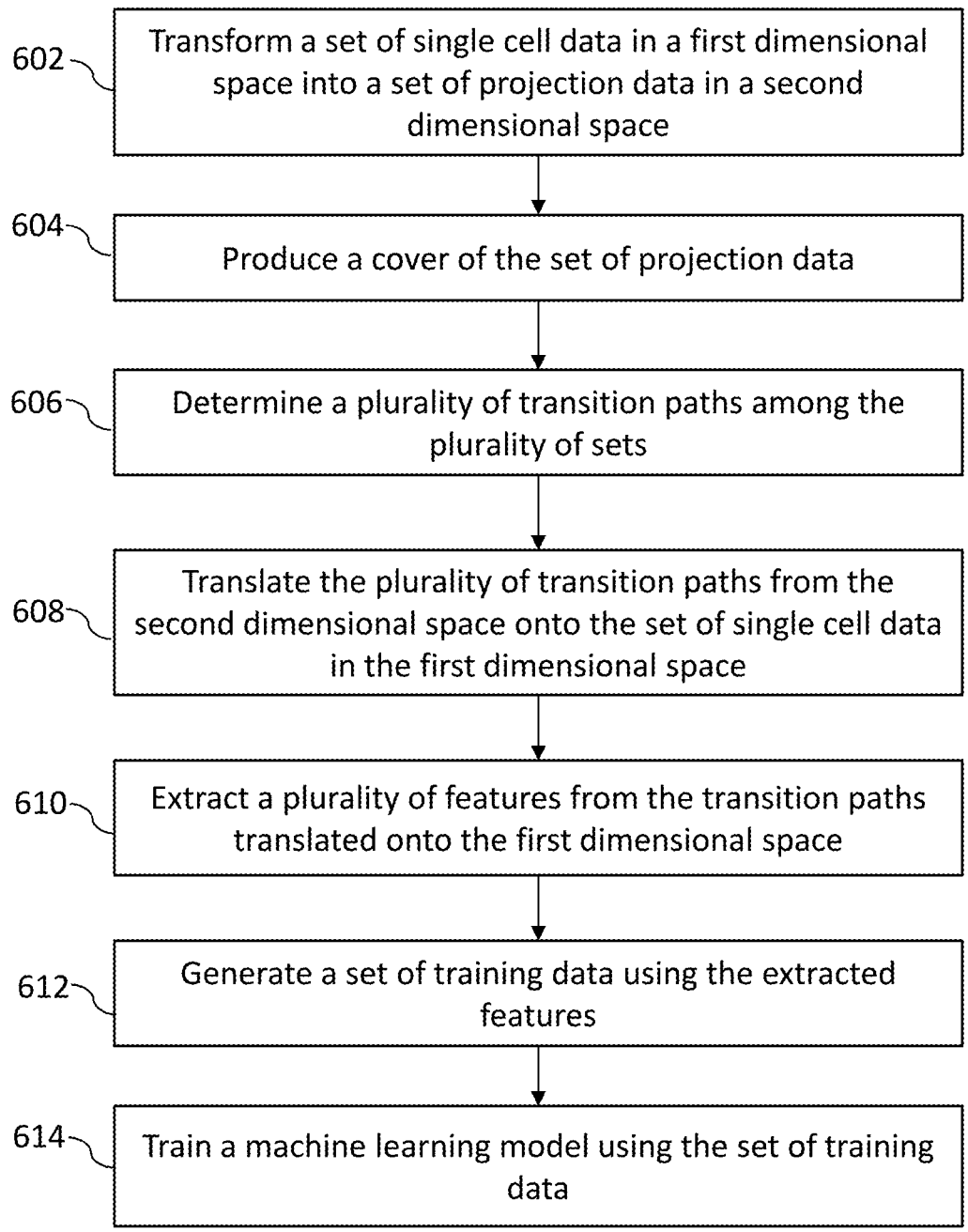
FIG. 6 is a flow diagram illustrating a process of implementing cell state transition features from single cell data in one embodiment.

FIG. 6 is a flow diagram illustrating a process 600 to implement cell state transition features from single cell data in one embodiment. The process 600 can include one or more operations, actions, or functions as illustrated by one or more of blocks 602, 604, 606, 608, 610, 612, and/or 614. Although illustrated as discrete blocks, various blocks can be divided into additional blocks, combined into fewer blocks, eliminated, or performed in parallel, depending on the desired implementation.

The process 600 can being at block 602. At block 602, a processor can transform a set of single cell data in a first dimensional space into a set of projection data in a second dimensional space. The second dimensional space can have a dimensionality lower than or equal to a dimensionality of the first dimensional space. In some examples, the set of single cell data can be one of a single cell deoxyribonucleic acid (DNA) sequencing data and a single cell ribonucleic acid (RNA) sequencing data.

The process 600 can proceed from block 602 to block 604. At block 604, the processor can produce a cover of the set of projection data. The cover can include a plurality of sets, and a union of the sets can include the entirety of the set of projection data. In some examples, the processor can cluster the projection data into a plurality of clusters. The processor can expand the plurality of clusters into the plurality of sets to produce the cover.

The process 600 can proceed from block 604 to block 606. At block 606, the processor can determine a plurality of transition paths among the plurality of sets. A transition path can represent a transition from one cell state to another cell state. In some examples, the processor can construct a simplicial complex from the plurality of sets. The processor can identify a plurality of nerves of the simplicial complex as the transition paths. A transition path can connect a pair of centroids of a pair of sets.

The process 600 can proceed from block 606 to block 608. At block 608, the processor can translate the plurality of transition paths from the second dimensional space onto the set of single cell data in the first dimensional space. The process 600 can proceed from block 608 to block 610. At block 610, the processor can extract a plurality of features from the transition paths translated onto the first dimensional space.

The process 600 can proceed from block 610 to block 612. At block 612, the processor can generate a set of training data using the extracted features. In some examples, the processor can extract a set of data points among the set of single cell data. The extracted set of data points can be data points on the transition paths translated onto the first dimensional space. In some examples, the processor can extract at least one data point having a particular characteristic.

The process 600 can proceed from block 612 to block 614. At block 614, the processor can train a machine learning model using the set of training data. The machine learning model can be trained for classifying transitions between different cell states. In some examples, the machine learning model can be trained for classifying transitions between different cell states including a transition from a current state of a plurality of cells to a medicine resistance state. In some examples, the machine learning model can be trained for classifying transitions between different cell states into a plurality of cell classes.

In some examples, the processor can receive new single cell data. The processor can run the machine learning model to classify the new single cell data into a particular cell state. The processor can retrain the machine learning model using the new single cell data and the particular cell state.

Figure 7:
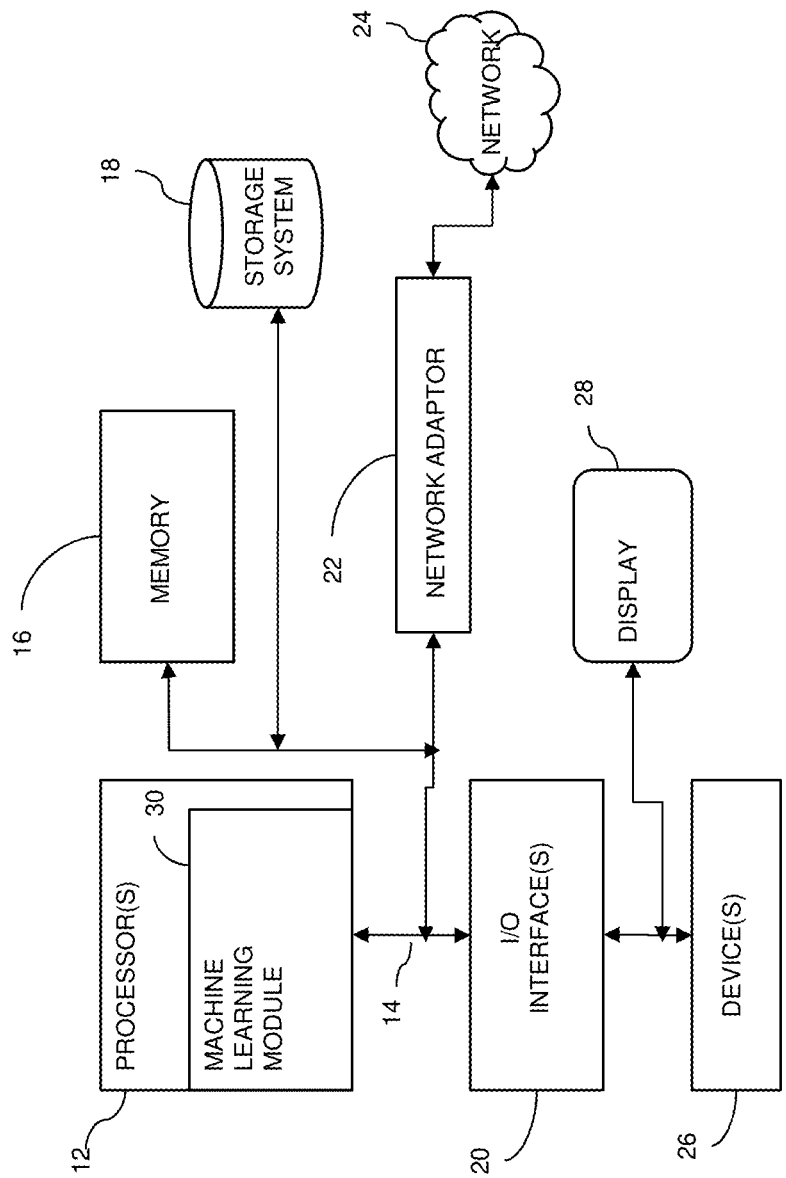
FIG. 7 illustrates a schematic of an example computer or processing system relating to cell state transition features from single cell data in one embodiment.

FIG. 7 illustrates a schematic of an example computer or processing system that may implement cell state transition features from single cell data in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being implemented by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., machine learning module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by a computing device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 8:
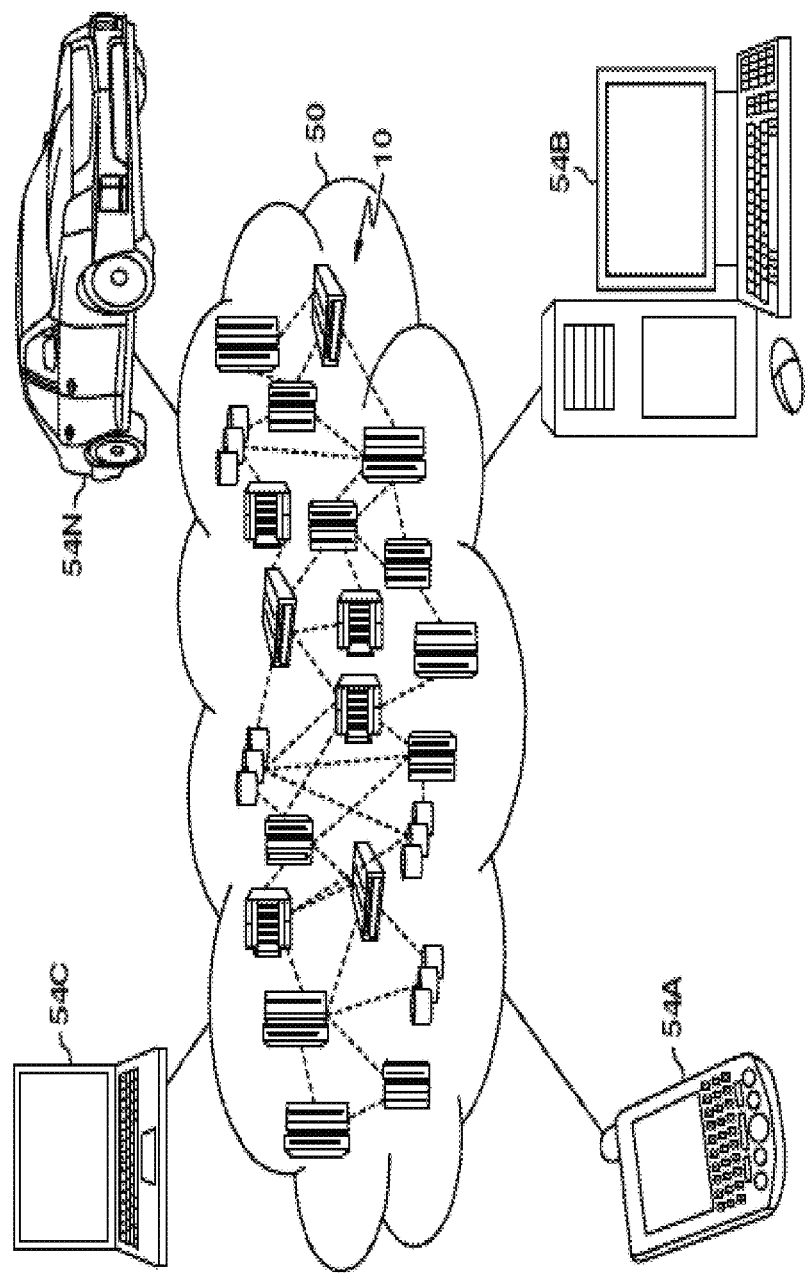
FIG. 8 depicts a cloud computing environment according to an embodiment of the present invention.

FIG. 8 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
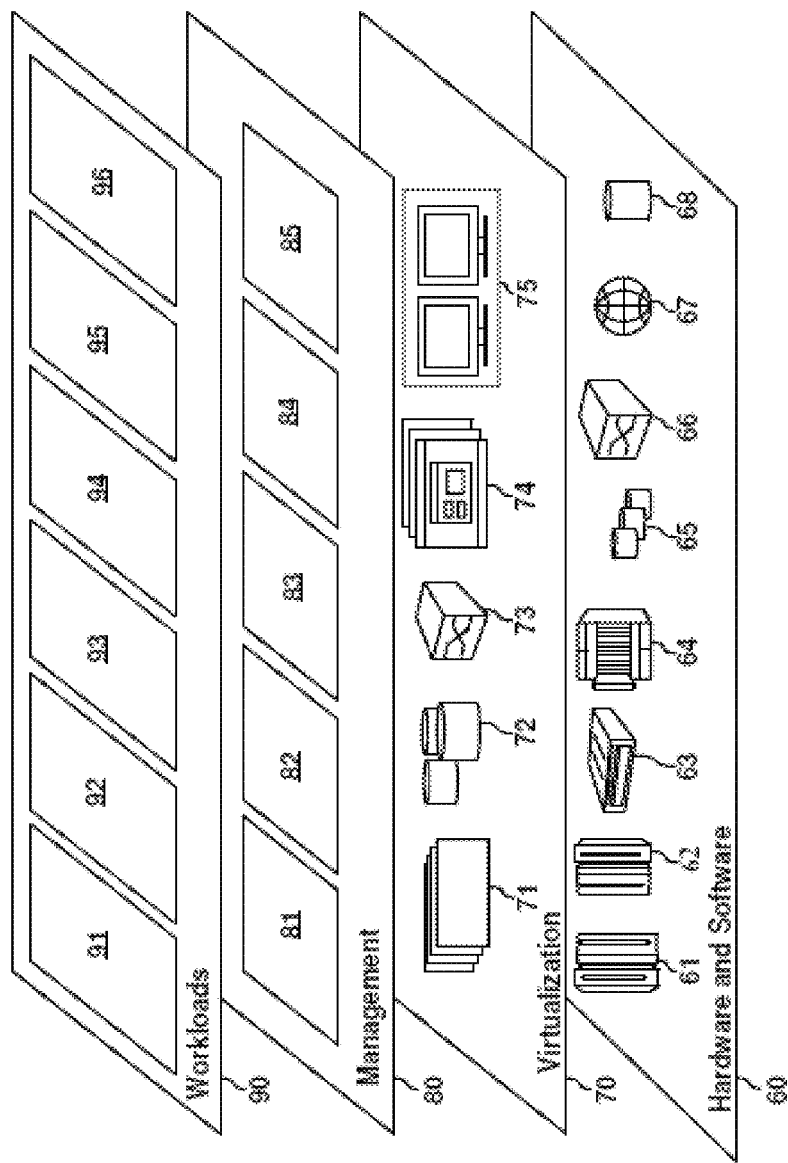
FIG. 9 depicts abstraction model layers according to an embodiment of the present invention.

FIG. 9 depicts abstraction model layers according to an embodiment of the present invention. Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cell state transition identification application 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for training a machine learning model, the method comprising:
   transforming, by a processor, a set of single cell data in a first dimensional space into a set of projection data in a second dimensional space having a dimensionality lower than or equal to a dimensionality of the first dimensional space;
   performing, by the processor, set covering on the set of projection data in the second dimensional space to produce a cover of the set of projection data, the cover including a plurality of sets, each set among the plurality of sets represents a cell state population, and a union of the sets includes an entirety of the set of projection data, wherein performing the set covering comprises:
      clustering, by the processor, the set of projection data in the second dimensional space into a plurality of clusters that are non-overlapping; and
      expanding, by the processor, the plurality of clusters until every one of the set of projection data in the second dimensional space is within a cluster, wherein the plurality of clusters that are expanded are set as the plurality of sets in the cover;
   determining, by the processor, a plurality of transition paths among the plurality of sets in the cover, wherein a transition path in the second dimensional space represents a transition from one cell state to another cell state;
   translating, by the processor, centroids of the plurality of sets, that are connected by the plurality of transition paths, from the second dimensional space onto the set of single cell data in the first dimensional space to create a plurality of translated transition paths in the first dimensional space;
   extracting, by the processor, a plurality of features from the plurality of translated transition paths in the first dimensional space;
   generating, by the processor, a set of training data using the extracted features from the translated transition paths in the first dimensional space;
   training, by the processor, a machine learning model using the set of training data; and
   running, by the processor, the machine learning model to classify an input single cell data into at least one transition between different cell states.

2. The method of claim 1, wherein the set of single cell data is one of a single cell deoxyribonucleic acid (DNA) sequencing data and a single cell ribonucleic acid (RNA) sequencing data.

3. The method of claim 1, further comprising:
   receiving, by the processor, new single cell data;
   running, by the processor, the machine learning model to classify the new single cell data into a particular cell state; and
   retraining, by the processor, the machine learning model using the new single cell data and the particular cell state.

4. The method of claim 1, wherein determining the transition paths comprises:
   constructing, by the processor, a simplicial complex from the plurality of sets; and
   identifying, by the processor, a plurality of nerves of the simplicial complex as the plurality of transition paths.

5. The method of claim 1, wherein extracting the plurality of features from the plurality of translated transition paths comprises extracting, by the processor, a set of data points among the set of single cell data, and the extracted set of data points are data points on the plurality of translated transition paths in the first dimensional space.

6. The method of claim 5, wherein extracting the set of data points from the plurality of translated transition paths in the first dimensional space comprises extracting, by the processor, at least one data point having a particular characteristic.

7. The method of claim 1, wherein the machine learning model is trained for classifying transitions between different cell states including a transition from a current state of a plurality of cells to a medicine resistance state.

8. The method of claim 1, wherein the machine learning model is trained for classifying transitions between different cell states into a plurality of cell classes.

9. The method of claim 1, wherein the expanding comprises expanding the plurality of clusters to include at least one outlier point in the second dimensional space that was excluded from the plurality of clusters prior to the expanding.

10. A system comprising:
    a memory configured to store a set of instructions; and
    a processor configured to be in communication with the memory, the processor being configured to execute the set of instructions to:
       transform a set of single cell data in a first dimensional space into a set of projection data in a second dimensional space having a dimensionality lower than or equal to a dimensionality of the first dimensional space;
       perform set covering on the set of projection data in the second dimensional space to produce a cover of the set of projection data, the cover including a plurality of sets, each set among the plurality of sets represents a cell state population, and a union of the sets includes an entirety of the set of projection data, wherein performing the set covering comprises:
  clustering, by the processor, the set of projection data in the second dimensional space into a plurality of clusters that are non-overlapping; and
  expanding, by the processor, the plurality of clusters until every one of the set of projection data in the second dimensional space is within a cluster, wherein the plurality of clusters that are expanded are set as the plurality of sets in the cover;
determine a plurality of transition paths among the plurality of sets in the cover, wherein a transition path in the second dimensional space represents a transition from one cell state to another cell state;
translate centroids of the plurality of sets, that are connected by the plurality of transition paths from the second dimensional space onto the set of single cell data in the first dimensional space to create a plurality of translated transition paths in the first dimensional space;
extract a plurality of features from the plurality of translated transition paths in the first dimensional space;
generate a set of training data using the extracted features from the translated transition paths in the first dimensional space;
train a machine learning model using the set of training data; and
run the machine learning model to classify an input single cell data into at least one transition between different cell states.

11. The system of claim 10, wherein the processor is configured to execute the set of instructions to:
  construct a simplicial complex from the plurality of sets; and
  identify a plurality of nerves of the simplicial complex as the plurality of transition paths.

12. The system of claim 10, wherein the processor is configured to execute the set of instructions to extract a set of data points among the set of single cell data to extract the plurality of features from the plurality of translated transition paths, and the extracted set of data points are data points on the plurality of translated transition paths in the first dimensional space.

13. The system of claim 10, wherein the extraction of the set of data points from the plurality of translated transition paths in the first dimensional space comprises an extraction of at least one data point having a particular characteristic.

14. The system of claim 10, wherein the machine learning model is trained for classifying transitions between different cell states including a transition from a current state of a plurality of cells to a medicine resistance state.

15. The system of claim 10, wherein the machine learning model is trained for classifying transitions between different cell states into a plurality of cell classes.

16. A computer program product for training a machine learning model, the computer program product comprising a computer readable storage medium having program instructions embodied therewith, the program instructions executable by a processing element of a device to cause the device to:
  transform a set of single cell data in a first dimensional space data into a set of projection data in a second dimensional space having a dimensionality lower than or equal to a dimensionality of the first dimensional space;
  perform set covering on the set of projection data in the second dimensional space to produce a cover of the set of projection data, the cover including a plurality of sets, each set among the plurality of sets represents a cell state population, and a union of the sets includes an entirety of the set of projection data, wherein performing the set covering comprises:
    clustering, by the processor, the set of projection data in the second dimensional space into a plurality of clusters that are non-overlapping; and
    expanding, by the processor, the plurality of clusters until every one of the set of projection data in the second dimensional space is within a cluster, wherein the plurality of clusters that are expanded are set as the plurality of sets in the cover;
  determine a plurality of transition paths among the plurality of sets in the cover, wherein a transition path in the second dimensional space represents a transition from one cell state to another cell state;
  translate centroids of the plurality of sets, that are connected by the plurality of transition paths from the second dimensional space onto the set of single cell data in the first dimensional space to create a plurality of translated transition paths in the first dimensional space;
  extract a plurality of features from the plurality of translated transition paths in the first dimensional space;
  generate a set of training data using the extracted features from the translated transition paths in the first dimensional space;
  train a machine learning model using the set of training data; and
  run the machine learning model to classify an input single cell data into at least one transition between different cell states.

17. The computer program product of claim 16, wherein the program instructions are further executable by the processing element of the device to cause the device to:
  construct a simplicial complex from the plurality of sets; and
  identify a plurality of nerves of the simplicial complex as the plurality of transition paths.

18. The computer program product of claim 16, wherein the program instructions are further executable by the processing element of the device to cause the device to extract a set of data points among the set of single cell data to extract the plurality of features from the plurality of translated transition paths, and the extracted set of data points are data points on the plurality of translated transition paths in the first dimensional space.

* * * * *